United States Patent [19]

Miller

[11] Patent Number: 4,606,172

[45] Date of Patent: Aug. 19, 1986

[54] DEVICE FOR AND METHOD OF WRAPPING A BALE OF RUMINANT ANIMAL FEEDSTUFF AND INJECTING IT WITH A CHEMICAL TREATMENT

[76] Inventor: Bob L. Miller, Box 47A, R.R. #1, Salisbury, Mo. 65281

[21] Appl. No.: 728,394

[22] Filed: Apr. 29, 1985

Related U.S. Application Data

[63] Continuation-in-part of Ser. No. 523,093, Aug. 15, 1983, abandoned.

[51] Int. Cl.⁴ .............................................. B65B 13/02
[52] U.S. Cl. .............................. 53/399; 53/111 RC; 53/431; 53/587; 56/16.8; 56/341
[58] Field of Search .................. 53/111 RC, 204, 211, 53/399, 431, 465, 587; 56/1, 16.8, 341; 100/73, 88

[56] References Cited

U.S. PATENT DOCUMENTS

| | | | |
|---|---|---|---|
| 4,084,707 | 4/1978 | McFarland | 414/24.5 |
| 4,120,405 | 10/1978 | Jones et al. | 414/24.5 |
| 4,185,549 | 1/1980 | Roepnack | 100/73 |
| 4,205,514 | 6/1980 | Wolrab | 100/88 |
| 4,228,637 | 11/1980 | Richey et al. | 100/73 |
| 4,296,595 | 10/1981 | Meiners | 56/341 |
| 4,343,132 | 8/1982 | Lawless, Jr. | 53/211 |
| 4,453,460 | 6/1984 | Rabe et al. | 100/73 |

*Primary Examiner*—John Sipos
*Assistant Examiner*—Donald R. Studebaker
*Attorney, Agent, or Firm*—Senniger, Powers, Leavitt and Roedel

[57] ABSTRACT

A device for wrapping a bale of ruminant animal feedstuff and injecting it with a chemical treatment, comprising a frame carried by a tractor, and a turntable with spikes thereon on the frame for holding a bale off the ground and rotating it relative to the frame. The device is equipped for holding a supply of wrapping material and for rotating the turntable and a bale thereon with the wrapping material attached to the bale, whereby the wrapping material is wrapped around the bale as the bale rotates with the turntable. The device is also equipped for injecting chemical treatment from a source on the tractor into the bale.

A method of injecting a chemical treatment into a bale is also disclosed.

15 Claims, 5 Drawing Figures

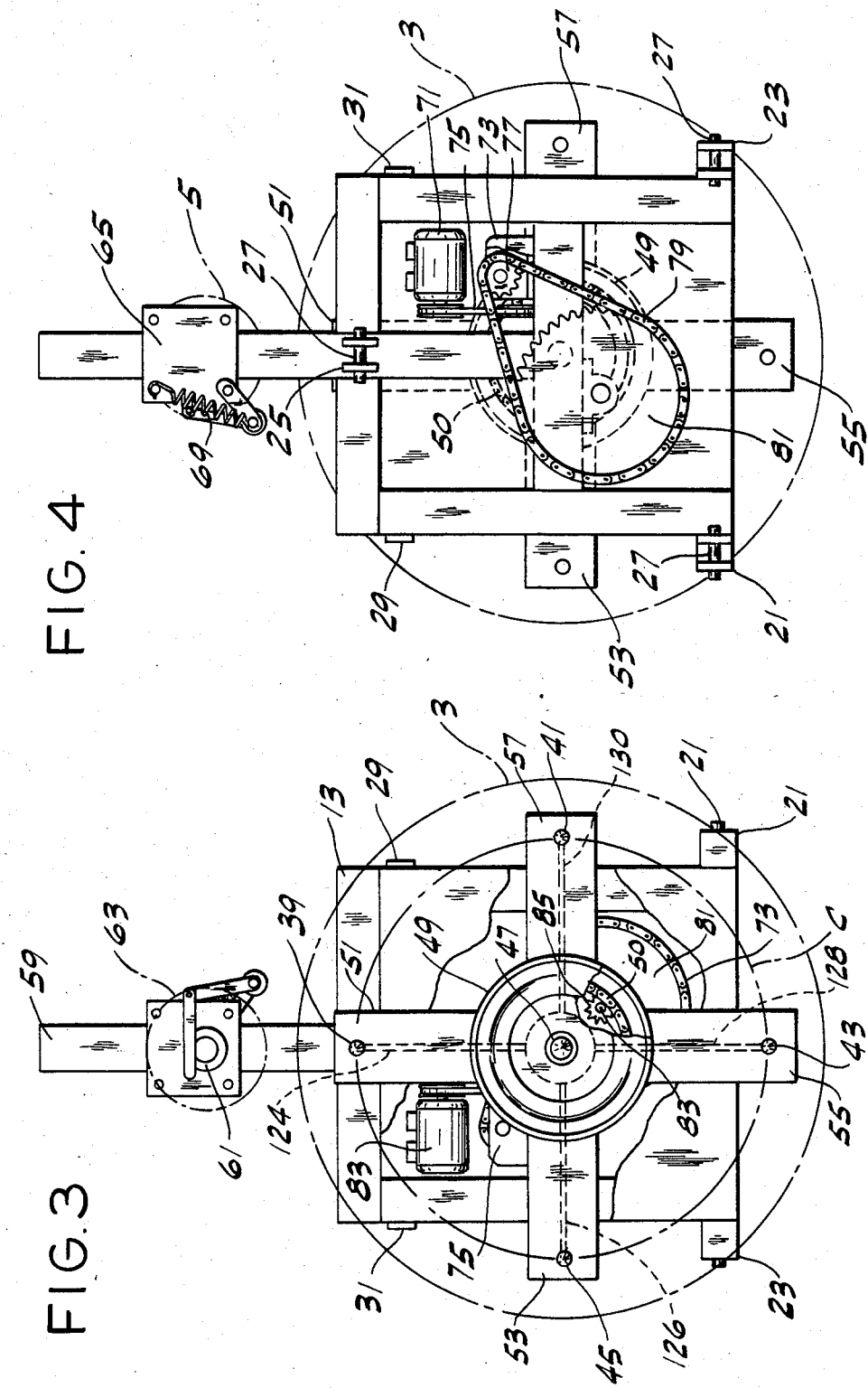

4,606,172

DEVICE FOR AND METHOD OF WRAPPING A BALE OF RUMINANT ANIMAL FEEDSTUFF AND INJECTING IT WITH A CHEMICAL TREATMENT

CROSS-REFERENCES TO RELATED APPLICATION

This is a continuation-in-part of U.S. application Ser. No. 523,093 filed Aug. 15, 1983, now abandoned.

BACKGROUND OF THE INVENTION

This invention relates generally to a device for an method of wrapping a bale of ruminant animal feedstuff, such as a bale of hay, and injecting a chemical treatment, and more particularly to a device for ammoniating a bale of hay for increasing the crude protein content of the bale, and to a method which permits one individual to do this.

As is known, a ruminant animal has the ability to convert poor quality roughages and nonprotein nitrogen into high quality protein. This conversion is accomplished by bacteria present in the rumen. However, a ruminant is not highly efficient in transforming forages into ruminant products such as meat and milk. One major factor that limits this efficiency is the level of nitrogen in the diet. Forages containing a low level of crude protein are not as valuable for the ruminant as are forages containing higher levels. For this reason, urea and other nonprotein nitrogen compounds have been used to boost the crude protein content of roughages containing low levels of nitrogen. Also, numerous studies have been conducted in which crop residues or agricultural products were treated with ammonia ($NH_3$) for the purpose of increasing the crude protein content and/or digestibility of the roughage. Reference is made to U.S. Pat. No. 4,321,278, dated Mar. 23, 1982, for a summary background of various methods for the chemical treatment of animal feedstuffs to increase the crude protein content thereof.

Heretofore, however, the treatment of animal feedstuffs, such as in the form of a bale of hay, has been a cumbersome, labor-intensive undertaking requiring a considerable amount of machinery and/or manpower.

SUMMARY OF THE INVENTION

Among the several objects of this invention may be noted the provision of a device for treating bales of ruminant animal feedstuff which is relatively inexpensive and can be conveniently used with conventional farm equipment; the provision of such a device which requires only one person to treat bales of ruminant animal feedstuff; the provision of such a device which is of relatively simple construction and easy to operate; and the provision of a method for treating a bale of ruminant animal feedstuff which is simple and practical for use by farmers.

Generally, a device for injecting a chemical treatment into a bale of ruminant animal feedstuff of this invention comprises a frame adapted to be carried by a vehicle such as a tractor and means on the frame, (e.g., a turntable with spikes thereon) for holding the bale off the ground and rotating it relative to the frame. The device further comprises means on the frame for holding a supply of wrapping material and means for rotating the bale-holding means and a bale thereon with the wrapping material attached to the bale, whereby the wrapping material is adapted to wrap around the bale as the bale rotates with the bale-holding means. The device also includes a source of a chemical treatment and means for injecting the chemical treatment into the bale.

The method of this invention involves treating a bale of ruminant animal feedstuff for increasing the crude protein content of the bale. The method comprises lifting a bale off the ground, attaching one end to a length of wrapping material to the bale, and rotating the bale while it is off the ground thereby to wrap the material around the bale. The wrapping material is cut after the bale has been wrapped and the cut end of the wrapping material secured to the bale to hold the material wrapped around the bale. A predetermined quantity of chemical treatment is then injected into the bale.

Other objects and features will be in part apparent and in part pointed out hereinafter.

BRIEF DESCRIPTION OF THE DRAWINGS

FIG. 3 is a front elevation of FIG. 4 with parts broken away to illustrate details;

FIG. 4 is a rear elevation of FIG. 2 with parts broken away to illustrate details.

Corresponding reference characters indicate corresponding parts throughout the several views of the drawings.

DESCRIPTION OF THE PREFERRED EMBODIMENT

Figure 1:
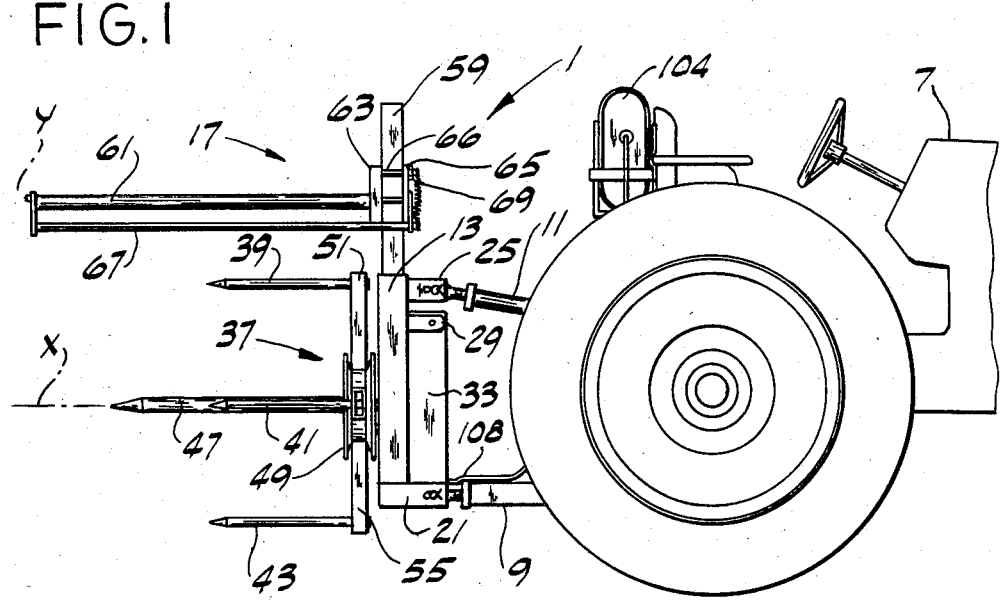
FIG. 1 is a side elevation of a device of this invention for injecting a chemical treatment into a bale the device being shown mounted on a three-point hitch of a tractor.

Referring now to the drawings, there is indicated at 1 a device for wrapping a bale 3 of ruminant animal feedstuff, e.g., hay, with a length of wrapping material 5 and then injecting a chemical treatment into the bale. The device 1 is shown mounted on a three-point hitch of a tractor 7 which includes lower lift arms 9 and an upper stabilizer arm 11.

In accordance with this invention, the device 1 is provided for lifting and wrapping a bale of hay 3, and for treating the bale with an appropriate chemical, and more particularly and preferably ammonia, to increase its crude protein content. The wrapping further protects the bale from exposure to rain, scavengers or degradation from various other sources when left out in a field or stored.

More particularly, device 1 comprises a frame 13 carried by a tractor 7 and means, such as generally indicated at 15, on the frame for holding a bale 3 of hay off the ground and rotating it relative to the frame. Means, as indicated at 17, is attached to the frame 13 for holding a supply of wrapping material above the frame. The device 1 further includes means 19 for rotating the bale-holding means 15 and a bale 3 thereon with the wrapping material 5 attached to the bale; whereby the wrapping material is adapted to wrap around the bale as the bale rotates with the bale-holding means. A source 104 of chemical treatment is suitably mounted on the tractor as shown in FIG. 1.

More particularly, the frame 13 is generally rectangular in shape and has two mounting brackets 21 and 23 at its bottom corners and one mounting bracket 25 at its top edge, generally in the center thereof for attachment of the hitch. As best shown in FIG. 4, the brackets 21, 23 and 25 are generally U-shaped and are welded to the frame. Each arm of the brackets has a hole therethrough for the insertion of a pin 27 for securing the frame 13 to the arms 9 and 11 of the hitch. As will be understood by those skilled in the art, pin 27 has a head on one end and a hole in the other end for receiving a cotter pin to retain pin 27 in position. The frame 13 also has flat brackets 29, 31 welded to the sides of the frame and slightly below mounting bracket 25 for the mounting of a shield plate 33. The shield plate 33, as shown in FIG. 1, covers rotating means 19 to keep hay and the like therefrom and to protect the operator of the tractor.

Means 15 for holding the bale of hay off the ground is shown to comprise a turntable 37 rotatable on the frame about an axis X and a plurality of elongate spikes 39, 41, 43, 45, 47 projecting generally perpendicularly from the turntable constituting means for securing a bale in fixed position with respect to the turntable for rotation therewith. The turntable 37 comprises a central hub 49 and a plurality of arms 51, 53, 55 and 57 projecting radially outwardly therefrom. The hub 49 is circular in shape and has a chain 50 secured (e.g., welded) to the inside therefor for rotation of the turntable 37, as will be described later. The arms 51, 53, 55 and 57 are generally rectangular in shape and are suitably secured (e.g., welded) to the hub. As shown in FIG. 3, when viewed from in front of the device, the arms lie generally on a circle C with the arms spaced at about 90 degree intervals on the circle. The diameter of the circle is smaller than the diameter of the bales 3 the device is designed to lift and wrap (the typical diameter of a bale being 5 feet). Spikes 39, 41, 43 and 45 are mounted at the outer ends of the arms 51, 53, 55 and 57, respectively, and a single center spike 47 is mounted in the center of the hub 49. As shown in FIGS. 1 and 2, the center spike is longer in length than the spikes on the arms. However, it is shorter than the length of the bale it is designed to impale (the typical length of a bale being 5 feet). The outer ends of the spikes are pointed for ease in impaling a bale thereon.

Figure 2:
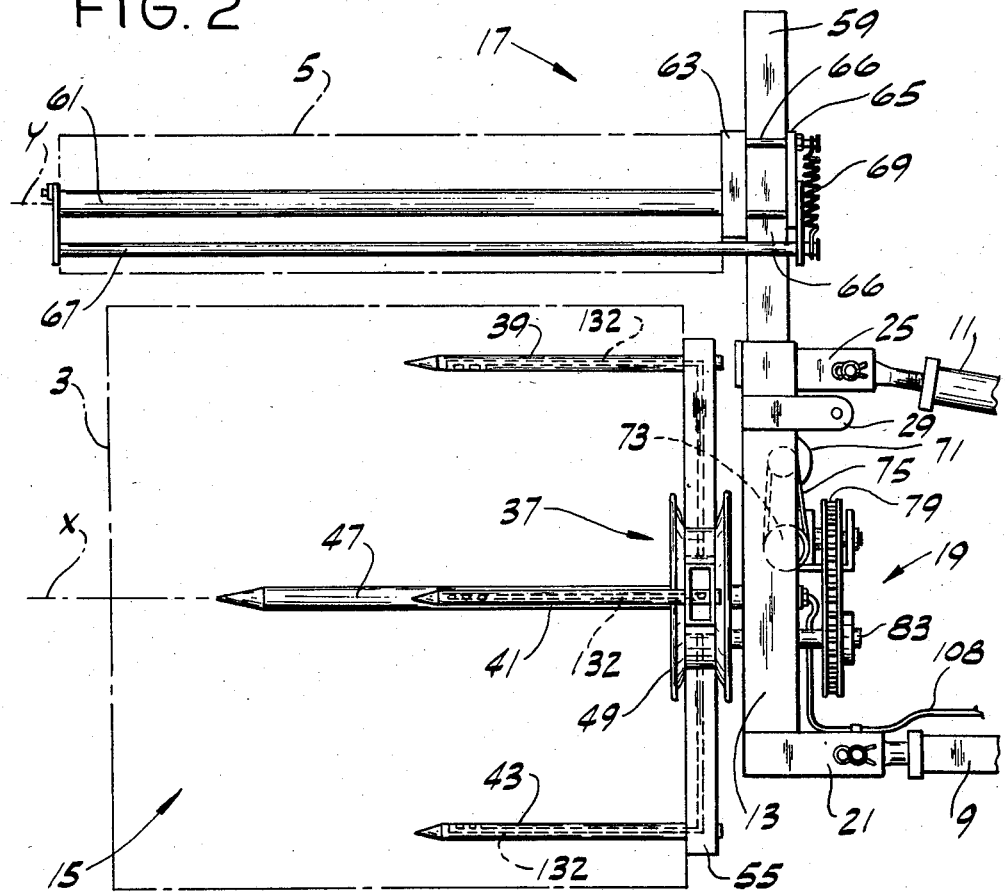
FIG. 2 is an enlarged side elevation of the device shown in FIG. 1 with the back shield removed and a bale and roll of wrapping material shown in phantom.

As seen in FIGS. 1 and 2, a post 59 extends upwardly from the top of frame 13 and has a cross arm 61 attached thereto extending generally parallel to the axis of rotation of the baleholding means 15. The post 59 and cross arm 61 constitute means 17 for holding a roll of wrapping material 5 thereon. Secured on one end of the arm 61 is a plate 63 which has a width greater than the width of post 59. The plate 63 has holes therethrough near its corners. As seen in FIGS. 2, 3 and 4, a second plate 65 is placed against the back side of the post, similar in shape to plate 63 and also having four holes therethrough. Bolts 66 are inserted through the holes of both plates 63 and 65 and nuts are secured on each end of the bolts to hold the arm 61 in place. It will be understood that the arm may be raised up or down with respect to the post 59 to accomodate bales of different size by loosening the nuts and setting the arm at its desired position and then retightening the nuts. The roll of material 5, such as plastic, is positioned on the cross arm 61 for rotation about axis Y which is generally parallel to and spaced a suitable distance from axis X of the bale-holding means 15. A retaining rod 67 is pivotably secured to the free end of arm 61 and plate 65 on post 59 and positioned under the cross arm 61. A spring 69 is secured to the one end of rod 67 and plate 65 for biasing the rod 67 against the roll of material 5 to prevent the material from unwrapping.

The turntable 37 (and hay bale thereon) is rotated by means generally indicated at 19 comprising a motor 71 mounted on the frame 13 and a gear reducer 73 driven by the motor via a belt-and-pulley system designated 75. The output shaft of the gear reducer has a sprocket 77 therein connected via a drive chain 79 to a second sprocket 81 secured to one end (the front end) of a horizontal drive shaft 83 journalled in the frame 13. The rearward end of the shaft 83 carries a sprocket 85 engageable with a chain 50 secured (e.g., welded) to the inside of the hub 49 for turning the latter.

As shown in FIG. 1, the source of chemical treatment may be in the form of a supply tank, containing, for example, liquid ammonia, suitably mounted on the rear of the tractor. Of course, it will be understood that this tank can be mounted at any convenient location on the tractor.

Figure 5:
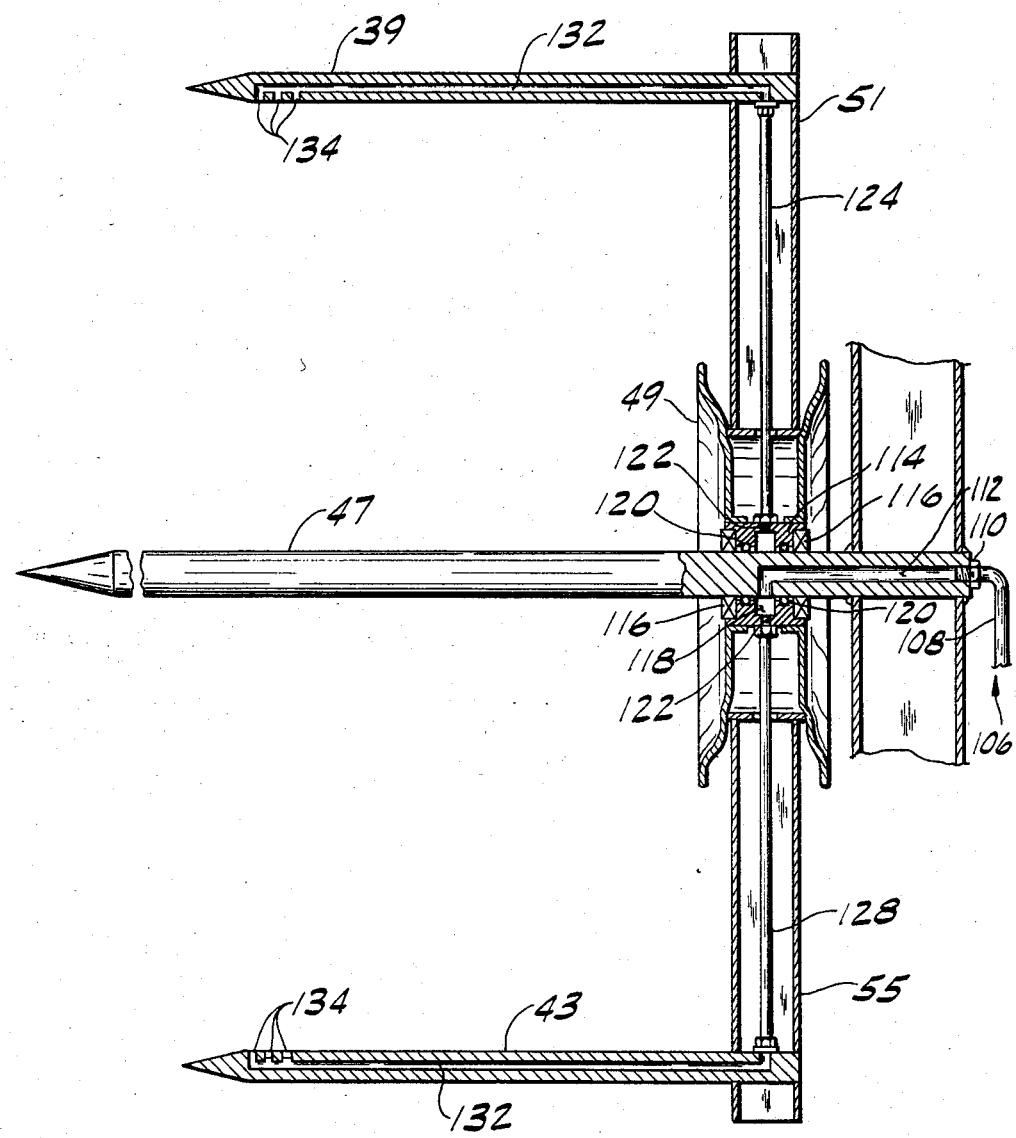
FIG. 5 is an enlarged portion of FIG. 2, parts being shown in section for purposes of illustration.

Generally indicated at 106 is means for injecting chemical treatment from the supply tank 104 into a bale impaled on the spikes 39–47. Means 106 comprises a conduit in the form of flexible tubing 108 connected at one end to tank 104 and at its other end via a suitable coupling 110 to a passage constituted by a bore 112 in the central spike 47 extending rearwardly (to the left as viewed in FIG. 5) from its forward (right) end. Means 106 also includes a manifold 114 mounted at the center of the hub 49 of the turntable for rotation on the central spike 47 by means of bearings 116 (see FIG. 5). The manifold has an inner annular groove therein constituting a distribution chamber 118, the latter being in communication with bore 112 in the central spike for flow of treatment into the chamber. O-rings 120 in the manifold on opposite sides of the chamber prevent leakage of fluid from the chamber. Four outlet ports, each designated 122, spaced at 90-degree intervals around the distribution chamber communicate with four lengths of conduit 124, 126, 128 and 130 extending lengthwise of arms 51–57 for flow of treatment from the distribution chamber through the conduit to the four outer spikes 39–45 at the outer ends of the arms. Each outer spike has a passage 132 extending axially thereof connected at its inlet end to a respective length of conduit 124–130. The outlet end of each passage 132 communicates with a series of exit ports, each designated 134, in the spike generally adjacent its outer end. Under normal circumstances, only one port 134 per spike is used, the remaining ports of each spike being suitably plugged.

Thus it will be understood that the supply tank 104 is in fluid communication with the exit ports 134 of the spikes 39–45 by conduit means or passaging comprising tubing 108, bore 112, chamber 118, outlet ports 122, conduit 124–130 and passages 132. A suitable regulator (not shown) is provided for regulating the flow of treatment from the tank 104 through this conduit means for injection into a bale impaled on the spikes 39–45.

The method of this invention of treating a bale of hay 3 by operating the above-described device 1 involves lifting a bale of hay off the ground, attaching one end of a length of wrapping material 5 to the bale, rotating this bale when it is off the ground thereby to wrap said wrapping material around the bale, cutting the wrapping material after the bale has been wrapped and securing the cut end of the wrapping material to hold the latter wrapped around the bale.

As will be understood from the drawings, the bale 3 is lifted by backing the device 1 and tractor 7 towards the bale and impaling it with the spikes 39-47. The bale 5 is then raised using the three-point hitch of the tractor 7. Once the bale is off the ground, the free end of the wrapping material 5 is pulled downward and against the bale. The free end is then secured (e.g., by either gluing or taping) to the bale of hay. The bale-holding means 17 and bale 3 thereon are then rotated by rotating means 19 on axis X for wrapping the bale with material 5. As the bale rotates, the roll of material is simultaneously rotated on axis Y thereby pulling the material off the roll and wrapping it around the bale. Once the bale is completely wrapped, bale-holding means 19 is stopped and the wrapping material is cut just above the bale. The cut end of the length around the bale is then secured to the bale. The bale is then rotated until the secured end of the wrapping material is located at the bottom of the bale and the bale is placed on the ground. Subsequently, one end of the bale is sealed either by securing a piece of plastic thereover or abutting two bales end to end. The wrapping material should preferably be 12 inches greater in width than the length of the bale to accomplish the seal. Once this is accomplished, a predetermined quantity of chemical treatment, e.g., ammonia, is injected into the bale through the other end by opening the regulator to permit flow of the treatment from the supply tank 104 into the bale. After a predetermined period of time (e.g., sixty seconds) the regulator is closed to shut off the flow and the tractor driven forward to remove the spikes from the bale.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

What is claimed is:

1. A device for wrapping a bale of ruminant animal feedstuff and for injecting a chemical treatment into the bale thereby to increase the crude protein content of the bale, said device comprising:
    a frame adapted to be carried by a vehicle such as a tractor;
    means on the frame for holding a bale of feedstuff off the ground and rotating it relative to the frame;
    means on the frame for holding a supply of wrapping material;
    means for rotating said bale-holding means and a bale thereon with said wrapping material attached to the bale, said wrapping material being adapted to wrap around the bale as the bale rotates with the bale-holding means;
    said bale-holding means comprising a turntable rotatable on the frame about an axis adapted to extend in front-to-back direction with respect to said vehicle, and a plurality of spikes on said turntable extending generally parallel to said axis and terminating in pointed outer ends for impaling a bale when said vehicle is driven toward the bale;
    a source of volatile chemical treatment; and
    means for injecting chemical treatment from said source through said spikes into said bale when the bale is impaled on said spikes.

2. A device as set forth in claim 1 wherein said injecting means is adapted for injecting treatment into said bale at a plurality of different locations in the bale.

3. A device as set forth in claim 2 wherein said injecting means comprises an exit port in each spike, and conduit means interconnecting said exit port and said source of treatment whereby treatment is adapted to flow from the source through said conduit means and to exit said spike via said exit port for injection into the bale.

4. A device as set forth in claim 1 wherein said turntable comprises a central hub and a plurality of arms projecting laterally outwardly therefrom, said spikes being mounted at the outer ends of said arms.

5. A device as set forth in claim 4 wherein said hub has a center spike thereon longer than the spikes on said arms.

6. A device as set forth in claim 5 wherein said injecting means comprises passages in the spikes at the outer ends of said arms and exit ports in the spikes communicating with said passages, treatment from said source being adapted to flow through said passages and out said exit ports into a bale impaled on the spikes.

7. A device as set forth in claim 6 wherein said exit ports are directed toward said center spike.

8. A device as set forth in claim 6 wherein said device further comprises means for regulating the flow of treatment from said source into said bale.

9. A device as set forth in claim 1 wherein said holding means is adapted for holding a roll of wrapping material for rotation about an axis generally parallel to and spaced from the axis of rotation of said bale-holding means.

10. A device as set forth in claim 9 wherein said wrapping material holding means comprises a post on the frame adapted to extend upwardly from the frame, and a cross arm on the post extending generally parallel to the axis of rotation of the bale-holding means, said cross arm being adapted for rotatably holding a roll of wrapping material thereon.

11. A method of wrapping a bale of ruminant animal feedstuff and injecting it with a chemical treatment for increasing the crude protein content of the feedstuff comprising:
    lifting a bale off the ground by piercing said bale with a plurality of spikes mounted on a vehicle, such as a tractor, with said bale extending endwise with respect to the vehicle;
    attaching one end of a length of wrapping material to the bale; rotating the bale while it is off the ground thereby to wrap said wrapping material around the bale;
    cutting the wrapping material after the bale has been wrapped; and
    after the bale has been wrapped, injecting the bale with a quantity of volatile chemical treatment through said spikes from a source carried by the vehicle.

12. A method as set forth in claim 11 further comprising placing the wrapped bale back on the ground with one of its ends abutting one end of a previously wrapped bale thereby to seal said one end of each bale, before injecting the bale with chemical treatment.

13. A method as set forth in claim 11 particularly adapted for wrapping a cylindric bale of ruminant animal feedstuff, said rotating step being accomplished by rotating the bale on its axis.

14. A method as set forth in claim 11 further comprising rotatably mounting a roll of wrapping material adjacent said bale whereby when said bale is rotated with one end of the wrapping material attached thereto the wrapping material is pulled off the roll and wrapped around the bale.

15. A method as set forth in claim 11 wherein the chemical treatment comprises treatment with ammonia.

* * * * *